(12) United States Patent
Holtslag et al.

(10) Patent No.: US 6,914,611 B2
(45) Date of Patent: Jul. 5, 2005

(54) WINDOW DETECTION

(75) Inventors: Antonius Hendricus Maria Holtslag, Eindhoven (NL); Christian Hentschel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 294 days.

(21) Appl. No.: 09/877,267

(22) Filed: Jun. 8, 2001

(65) Prior Publication Data

US 2002/0051056 A1 May 2, 2002

(30) Foreign Application Priority Data

Jul. 7, 2000 (EP) .............................. 00202379

(51) Int. Cl.[7] .............................. G09G 5/00; G09G 5/02
(52) U.S. Cl. ........................... 345/581; 345/589
(58) Field of Search ................................. 345/619, 581, 345/589, 419, 611, 426

(56) References Cited

U.S. PATENT DOCUMENTS 6,535,221 B1 * 3/2003 Allen et al. ................. 345/611

FOREIGN PATENT DOCUMENTS

WO   WO9921355   4/1999   ............ H04N/5/20

OTHER PUBLICATIONS

Foley et al., "Computer Graphics: Principles and Practice", 1996, Addison–Wesley Publishing Company, Inc., pp. 585–586.*

Shen, F. & Wang, H., "A lcal edge detector used for finding corners", School of Electrical and Electronic Engineerin, Nanyang Technological University, Singapore.*

* cited by examiner

*Primary Examiner*—Jeffery Brier
*Assistant Examiner*—Chanté Harrison
(74) *Attorney, Agent, or Firm*—Dicran Halajian

(57) ABSTRACT

Apparatus for identifying the four coordinates of a window on a visual display monitor, include a device for obtaining digital data corresponding to pixels of an image to be displayed on the monitor, a memory arranged to receive the digital data, a comparator arranged to compare the values of data for horizontally and vertically adjacent pixels, a generator for generating a gradient value indicative of the difference in luminance of adjacent pixels—in the horizontal and in the vertical directions, a memory for storing the gradient values, a detector for detecting a unique configuration in the gradient values to identify the three coordinates of one edge of the window, and a device for checking in the direction perpendicular to the identified edge for a corresponding unique configuration, to determine the fourth coordinate of the window.

60 Claims, 4 Drawing Sheets

WINDOW DETECTION

The present invention relates to the detection of designated screen areas, usually termed "windows" in electronic display devices, particularly in monitors for computer terminals or for video display devices, including CRT monitors and matrix display based monitors.

In modern display devices, it is frequently required to display several different files simultaneously. These may be from the same, or from different, applications and may contain the same or different types of media, for example, text, graphics, photographs, and video may all be displayed on a monitor screen at the same time. These media are displayed in separate boxes called windows which may be tiled to be adjacent or to border each other or more often are relatively randomly displayed in overlapping arrangements. To obtain the best reproduction of photographs and moving images, compared to text, different screen settings are required. For example, video images are improved if the contrast (difference in luminance between black and white areas) is increased. However, screen settings on a traditional monitor apply to the whole area of the screen and it is not generally possible to differentiate different areas separately. For a composite screen, the only way to enhance photographic or video images is to detect the relevant screen area or window and use software to change the display settings in that window.

It is known from WO99/21355 to use computer software to add markers to the image corresponding to a window, and these marker signals are subsequently used to locate the screen area concerned and to generate control signals to enhance the image quality within that screen area. This method is effected by a computer loaded with software which is specially adapted to different computer applications and different operating systems.

It is an object of the present invention to provide a relatively simple and cost-effective means of window detection which is preferably implementable in hardware directly in the monitor and is relatively independent of operating system and of application.

According to the present invention, there is provided an apparatus for identifying the four coordinates defining the corners of a window on a visual display monitor, the apparatus comprising means for receiving digital pixel data corresponding to pixels of an image to be displayed on the monitor, a line memory arranged to receive the digital pixel data, a comparator arranged to compare the values of data for horizontally and vertically adjacent pixels, means for generating a gradient value indicative of the difference in luminance of adjacent pixels in the horizontal and in the vertical directions, a memory for storing the gradient values, means for detecting a unique configuration in the gradient values to identify three coordinates of one edge of the window, and means for checking the gradient values in a direction perpendicular to the identified edge for a corresponding unique configuration to determine the fourth coordinate of the window.

The four coordinates defining the corners of the window are:

the coordinate defining the vertical position of the top edge of the window, the coordinate defining the vertical position of the bottom edge of the window, the coordinate defining the horizontal position of the left edge of the window, and the coordinate defining the horizontal position of the right edge of the window.

The three coordinates of one edge of the window are, for example, for a horizontal edge, the two coordinates of the left most corner point of the edge and the coordinate of the right most corner point defining the horizontal portion thereof.

The unique configuration in the gradient values comprises a line of high gradient values in one of either the horizontal or the vertical direction, with a high gradient value in the direction perpendicular to the line at one end of the line and a high gradient value diagonally adjacent the other end of the line. The configuration at said other end of the line is in the form of a corner gap, the gap being formed by a low gradient value.

Memories may be incorporated into a common memory block and a single line memory may be used to store the gradient values for two adjacent lines of the image.

A method of detecting a window on a visual display monitor is also provided.

Preferably, the means for obtaining digital data corresponding to pixels of an image to be displayed comprises means for receiving an analogue signal supplied to the monitor and an analogue-to-digital converter.

According to one embodiment, the converter is a multiplexed analogue-to-digital converter and, in another embodiment, three analogue-to-digital converters are provided.

According to a particularly preferred embodiment, as applied to an RGB display, the apparatus is adapted to receive and handle data corresponding only to the green channel since this accounts for 60% of the luminance in a color image. Instead of individual R, G and B values, a luminance value alone can be used, by analogue summing of the R, G and B values before digital conversion.

At least two adjacent rows are sampled in relevant screen areas and the window detection rate is improved if 4 rows are sampled.

Preferably, a single memory is used and re-filled with data on each scan of a different part of the screen.

Apparatus according to the present invention can be constructed to have considerable advantages over the known arrangements because it can be installed directly in the monitor itself, using hardware, and it is not dependent upon the operating system or application. It can detect windows either with or without borders and is less prone to noise than known apparatus.

For a better understanding of the present invention and to show how the same may be carried into effect, reference will now be made to the accompanying drawings, in which.

Figure 1:
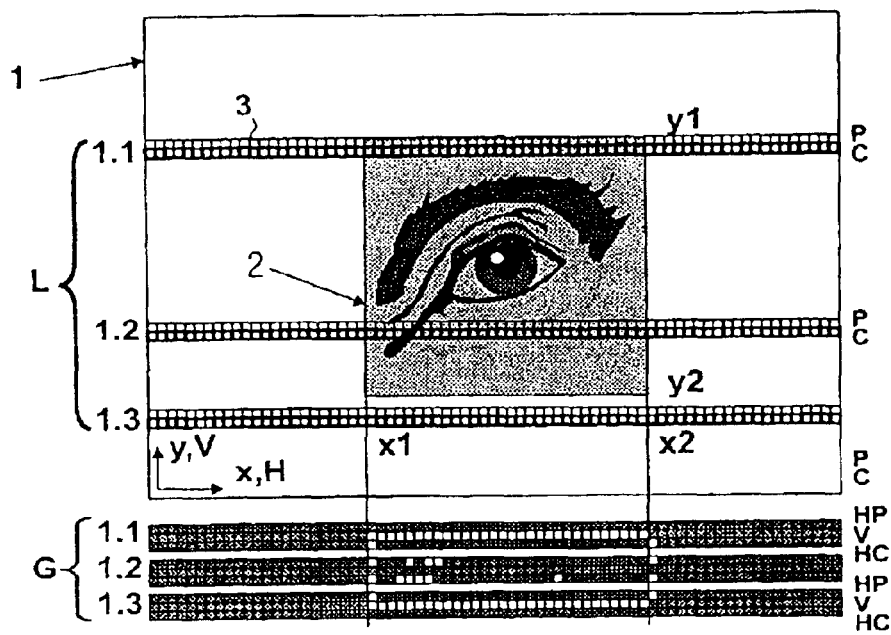
FIG. 1 shows a monitor display including a picture without a border illustrating the application of apparatus according to the invention.

In FIG. 1 a visual display monitor 1 is shown with a window 2 displaying a picture of an eye. The image across the whole monitor is made up of discrete pixels 3 in a regular array comprising a grid having rows and columns. A full screen may, for example, comprise 1200×1600 pixels in a CRT monitor. The pixels 3 are illuminated on the basis of data fed in digital or analogue form depending upon the requirements of the monitor 1. Currently, most monitors are supplied with analogue RGB signals, and in this case an analogue-to-digital converter is provided (one multiplexed A/D converter or three A/D converters are needed and should preferably be capable of generating 4-bit values). The data corresponding to each of two rows of the screen P (previous row) and C (current row) as illustrated in FIG. 1 at three different positions at different time moments are sampled and composed using line memories L and comparators, such that three other line monitors G (1.1, 1.2, 1.3) can be filed with data representing gradients. For example, at location 1.1 on the monitor 1 at the top of the picture 2, the data in consecutive horizontal rows P and C is compared. Row P is the data line just above the picture 2 and row C includes the top line of the picture 2. These two lines of data are compared in the vertical direction (i.e. to each other) and in the horizontal direction for each line. Thus three further lines of data are generated:

HP=horizontal gradient on line P
V=vertical gradient
HC=horizontal gradient on line C.

These lines of data for each location L are stored in gradient memory G as shown below the picture for each of the two-row bands 1.1, 1.2 and 1.3, respectively, at the top of the picture, in the middle and at the bottom. When two adjacent pixel values differ substantially, as determined by a predetermined threshold value, then a logic '1' is entered into the gradient memory G, and is represented by white in the Figures. If the consecutive pixel values are relatively closely similar, then a logic '0' is recorded in the gradient memory G and represented by black in the Figures. The gradient obtained for the horizontal direction along line P is entered at 1.1 HP, for the horizontal direction along line C is entered at 1.1 HC and for the vertical direction is entered at 1.1 V. This is repeated for each band 1.2 and 1.3 and the corresponding gradient memories G are filled up.

In practice, a single line memory can be used and line data and subsequently gradient data entered sequentially.

With regard to the top band 1.1, the horizontal line gradient HP for the top line P produces a row of logic '0' (black) because the background to the picture is generally all the same or has a similar color or it changes very slowly and thus no sudden changes occur. The horizontal gradient HC for the top line C of the picture produces predominantly logic '0' because the differences between the luminescence of adjacent pixels does not change significantly, except at the first and last pixels of the picture in line C which correspond to the coordinates x1 and x2, respectively. The gradient V in the vertical direction, (comparing line P with line C) is a row of logic 1 for the length of the picture, i.e. it runs from coordinate x1 to coordinate x2. Thus a unique configuration of gradient values generated for the top edge of picture 2 as shown at 1.1. This comprises a line of high gradient values with a perpendicular leg at one end and a diagonal leg, or dog-leg at the other end of the line. As can be seen at 1.1 in FIG. 1, this unique configuration is quite distinctive. The coordinate of the corners of the picture window 2 are given by the coordinates of the ends of the line and thus x1, x2 and y1 will be known.

The apparatus of the invention continues to scan the screen 1 containing picture z and looks for a repeat, or alternatively a mirror image of the gradient pattern produced by the top edge of the picture, i.e. for a corresponding unique configuration. As can be seen in FIG. 1, the band 1.2 sampled in the middle of the picture does not match, but band 1.3 at the bottom of the picture does correspond/match and thus the second y co-ordinate y2 can be found so that all four coordinates of the corners of picture 2 are known: (x1, y1), (x1, y2), (x2, y1), (x2, y2).

Noise can make it more difficult to detect a gradient correctly. In FIG. 1, at position 1-2, some horizontal and vertical gradients are detected in the middle of the picture. This could incorrectly also happen at the borders. In this case, the embodiment of FIG. 3 would assist. This uses a 5-bit deep gradient memory so that a distinction can be made if the horizontal gradients continue in the vertical direction at more than one pixel. Note that the gradients have a very typical structure at the corners: this structure is traditionally used in software as a mask to detect if a corner is present.

Alternatively, the horizontal positions can be used as a prediction for the vertical edges of the window and this can be checked using a slider as described below with reference to FIG. 4.

Only one data and one gradient line memory is needed since they are re-used at different locations, i.e. refreshed by the data of the next line. The content of the data memory is updated as if it slides across the full screen and the combination of the data and gradient memories is called a slider.

Alternatively, two vertical sliders and one horizontal slider can be used simultaneously but in hardware implementations one horizontal slider will suffice.

Even when using two vertical sliders, a single data line memory will suffice but the search time is then likely to be doubled.

A slider can effectively share 3 or more values per pixel (0=no gradient, 1-gradient or values stored with more resolution).

The sliders store data for one complete row, or for a vertical slider, one complete column, of the image.

If sufficient neighbouring data on a line in the gradient memory are 1 with a 1 gradient in the other direction at the end of the data, then a border has almost certainly been detected and three out of four coordinates are known. A gap in the 1 data along the line in the slider prompts the apparatus to 'look' in the other direction and thus the fourth coordinate is found.

The search can start at the top, at the boundaries or in the middle of a screen. In principle, the vertical direction is searched only once with a single horizontal slider from top to bottom. The time taken will be one frame time (17 ms). Both horizontal and vertical directions can be searched simultaneously and this is advantageous if noise or gradients in the image are present.

Instead of using RGB data, the luminance data L (L=0.3R+0.6G+0.1B) can be used by summing the R, G and B signals before the A/D conversion. Alternatively, the green (G) channel alone can be used since this represents 60% of the luminance.

Figure 2:
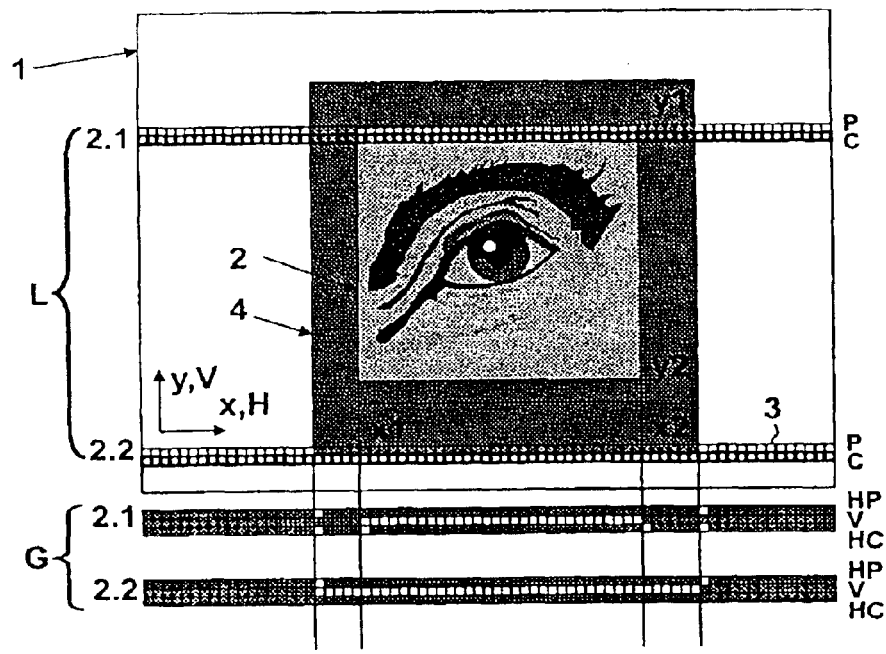
FIG. 2 shows a monitor display including a picture with a border illustrating the application of apparatus according to the invention.

FIG. 2 shows the same principle applied to a picture with a border 4. Band 2.1 is at the junction of the border 4 with the top of the picture and band 2.2 is at the junction of the bottom of the border 4 with the background screen. The gradients from the border to the background color always have the same value, while the gradient from the border to the picture will be different (and this can be used as an additional criterion for the inner and outer detection of the border co-ordinate). It can be decided to enhance only the inner part (the window content) or to enhance also the border bar.

Of the four border bars of a window 2, the bottom bar might be broader. Any one bar has two perpendicular bars or legs at the end. Note that the gradients have a very typical structure at those legs. The corners of the border bars can again be described with 4 co-ordinates. Again in FIG. 2, a three-bit deep 'gradient' memory is drawn. A bar can be detected by subtraction of the co-ordinates found to give an additional indication of a window found.

Figure 3:
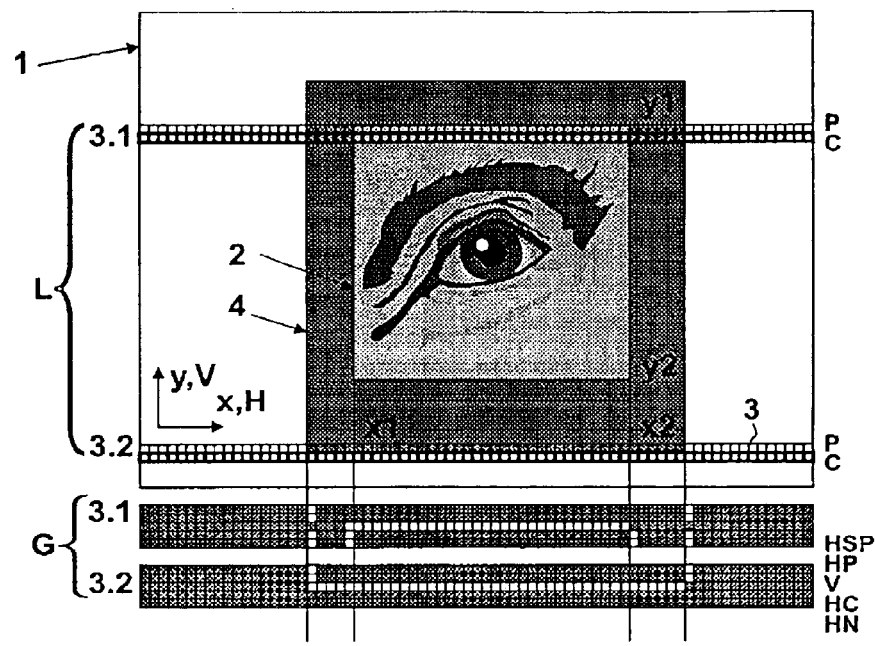
FIG. 3 shows a monitor display including a picture with a border illustrating the application of an alternative embodiment of apparatus according to the invention.

FIG. 3 shows the same sampling as in FIG. 2 for a picture with a border, but four rows are sampled and the gradients are stored in the gradient memories 3.1 and 3.2.

As time proceeds, the gradient memories are updated: the oldest data is displayed from the memory location HSP, the new HSP is linked to data in the previous BP, the new HP is linked to data in the previous HC, the new HC is linked to data in the previous HN and the new HN is linked to the new data to be stored in the memory location HSP. A decision is now taken on data collected in more memory locations.

Figure 4:
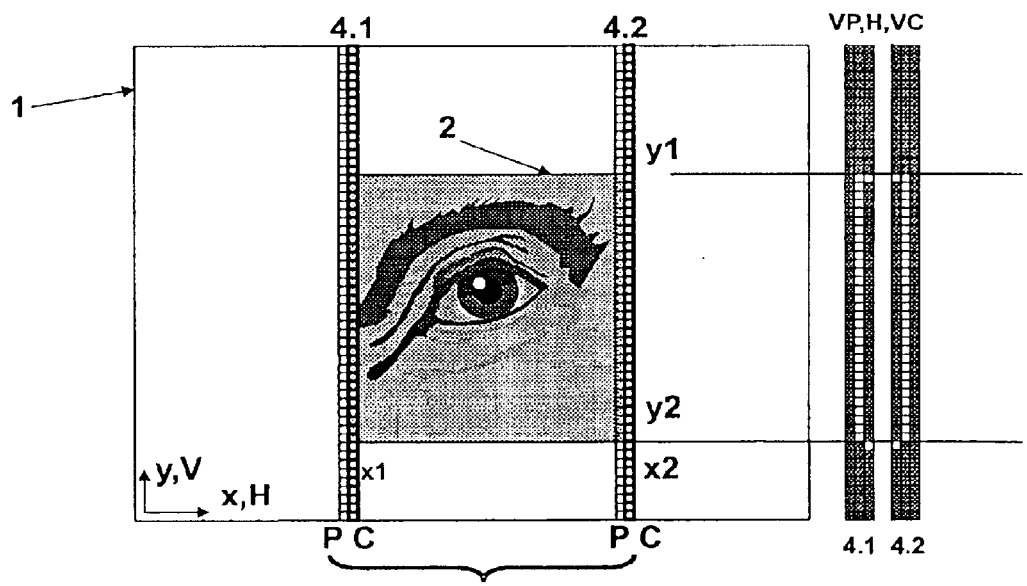
FIG. 4 shows a monitor including a picture without a border illustrating the application of another embodiment of apparatus according to the invention.

FIG. 4 shows the principle applied to vertical scan bands 4.1, 4.2 of a screen display, i.e. using vertical sliders.

The minimum search time for borders, if one window is present, can be determined for a vertical slider as follows: note that $2^{10}$=1024, thus within 10 search steps we will be able to detect a vertical border of the window, if a vertical slider is used, by dividing each time the remaining search interval. This means that after about 10 frame times (thus at 60 Hz after 0.17 seconds), we will find the borders. Using only horizontal sliders, the co-ordinates are known after one frame time. Again, (for robustness, the slider memory may be 3 or 5 bits wide: then 'legs' in the vertical direction, with a length of only 2 pixels, can be detected).

Figure 5:
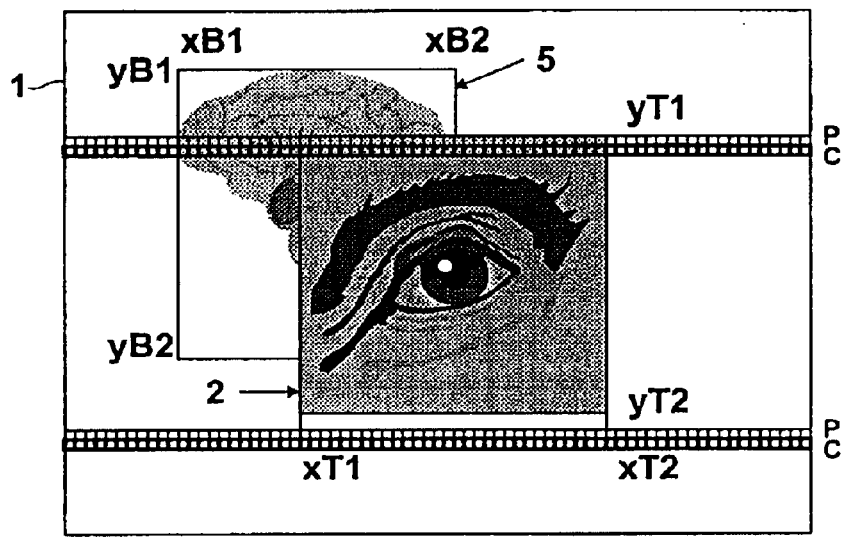
FIG. 5 shows a monitor display including two overlapping pictures without borders illustrating the application of a further embodiment of apparatus according to the invention.
Figure 6:
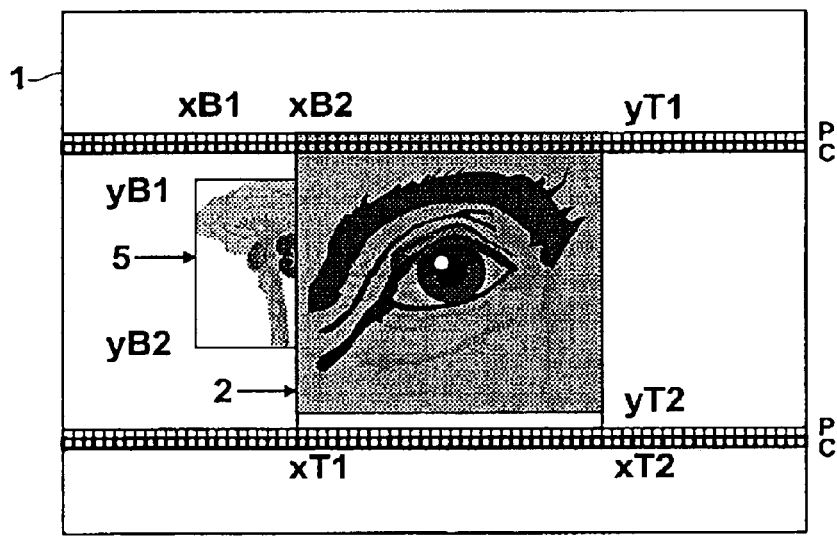
FIG. 6 shows a monitor display including two overlapping pictures without borders illustrating another application of apparatus according to the invention.

FIGS. 5 and 6 show the principle applied to overlapping pictures.

The basic idea is to look with the line memory in two directions. The one-slider position at least 4 (and 3 different) co-ordinates are obtained for windows on top and the same horizontal co-ordinates will again be found a little bit later. So only the window 2 with full rectangle border visible will be considered as a candidate for enhancement. In the embodiment of FIG. 5, a window is pushed to the background 5. The highlighting in that window 5 is lost. Background windows, meaning a window with an overlap to another window on top, and with a non-rectangular visible shape will not be enhanced. In the embodiment of FIG. 6, both can still be enhanced.

After detecting the window co-ordinates, it will be decided automatically if the window is enhanced or not. Only photographs and video (moving or not) will be enhanced: the criterion will be to have sufficient colors or sufficient different luminance values: at natural pictures, all or most of the 225 different R, G and B (or luminance values) will be expected, At typical artificial pictures, this will not be the case, and only a few colors are present. The enhancement factor will be based on the display load or based on the average luminance value up to a maximum and minimum enhancement factor. The display load is the relative number of the cells turned on in the window of the picture. For PAL television this is typically 10% of the cells only. The relative averaged luminance is almost the same to the display load for natural video. The gain is selected inversely proportional to the display load, and for PAL television, it could be 10 on average.

Figure 7:
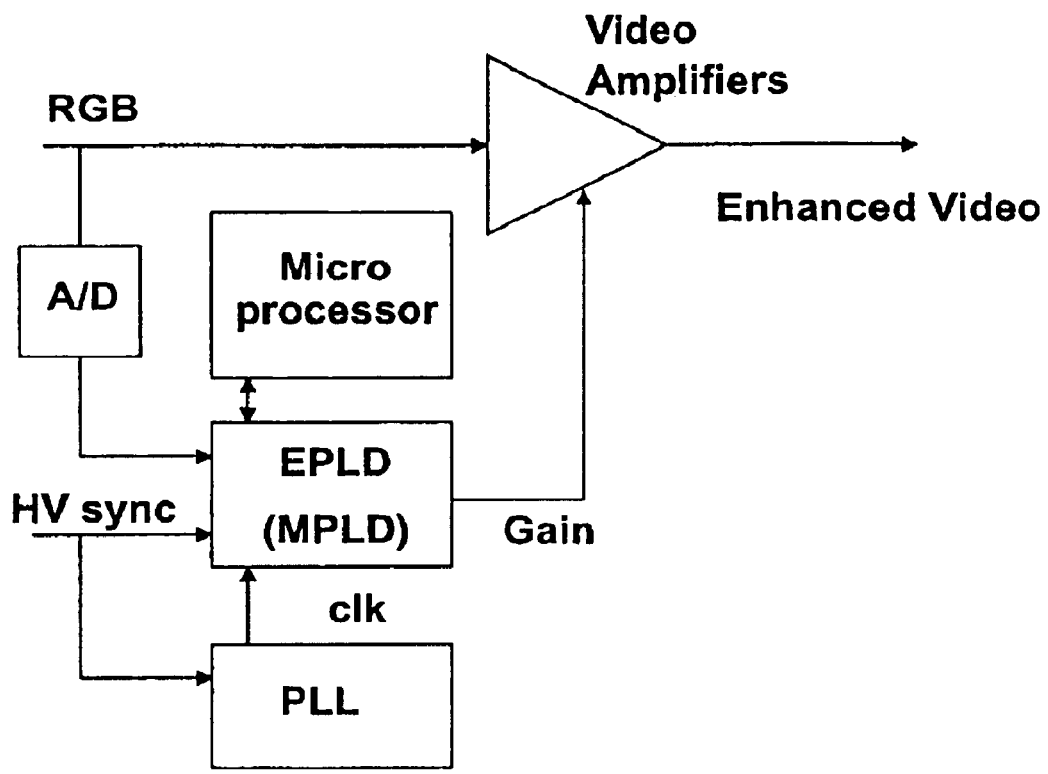
FIG. 7 is a block circuit diagram of apparatus according to the invention.

FIG. 7 is a block circuit diagram illustrating one embodiment of apparatus according to the invention. The horizontal and vertical synchronisation signal "HV synch" is supplied to a phase-locked loop detector PLL which generates a pixel clock pulse clk. An analogue RGB video signal is converted to digital data in the analogue-to-digital converter A/D and is supplied in digital form to an EPLD (which may be, for example, an Altera 10k50 series), or alternatively an MPLD. An EPLD/MPLD usually comprises programmable RAM and this forms the line memories for temporary storage of the data being compared, and for the determination of the coordinates of the picture. In addition, the EPLD/MPLD provides means for integrating over all luminance values in the window being detected to determine the display load. This indicates whether the picture is video or photographic material (sufficient colors should be present) and will determine the enhancement factor and whether enhancement is to be implemented.

The EPLD/MPLD communicates with a microprocessor in which the intelligence is located to select the required window from the data processed in the EPLD and to determine the gain factor. The required gain is then supplied to video amplifiers to enhance the input video signal RGB as required.

The incoming video signal RGB may alternatively be converted to a luminance signal and then converted to a digital luminance stream for processing via the EPLD and microprocessor.

Of course, all parts illustrated in FIG. 7 can be integrated into a single low-voltage chip and installed in a monitor and activated or deactivated at the choice of the user by a push-button control. Thus the PC itself is not needed and the enhancement is independent of the operating system and the application being run. However, the PC can be involved in particular embodiments of the invention.

The invention is also applicable to matrix display based monitors.

What is claimed is:

1. An apparatus for identifying four coordinates of a window displayed on a monitor, said apparatus comprising:
    a generator configured to generate gradient values indicative of changes in pixel data of at least one image displayed on said monitor for pixels that are adjacent in horizontal and in vertical directions;
    a memory being configured to store said gradient values; and
    a detector configured to detect a first unique configuration in said gradient values to identify three coordinates of one edge of said window; said detector being configured to check in a direction perpendicular to said one edge to detect a second unique configuration in said gradient values to determine a fourth coordinate of said window,
    wherein said first unique configuration includes a first line of consecutive first level of gradients, and a second line gradients including at least one first gradient having said first level at a perpendicular location from a first end of said consecutive gradients and at least one second gradient having said one level at a diagonal location from a second end of said consecutive gradients.

2. Apparatus as claimed in claim 1, wherein at least one of the first and second unique configurations in the gradient values comprises a line of high gradient values in one of either the horizontal or the vertical direction, with a high gradient value in the direction perpendicular to the line at one end of the line and a high gradient value diagonally adjacent the other end of the line.

3. Apparatus as claimed in claim 1, wherein the digital data is obtained from RGB values.

4. Apparatus as claimed in 3, wherein the R, G and B values are summed with weighing factors in order to generate a representative luminance signal before being converted to digital data.

5. Apparatus as claimed in claim 1, wherein only green channel values are used.

6. Apparatus as claimed in claim 1, wherein the gradient values are determined by comparison with a predetermined threshold value.

7. Apparatus as claimed in claim 1, wherein the memory comprises at least one line memory.

8. Apparatus as claimed in claim 7, wherein the line memory has a length corresponding to the numbers of pixels in a row of the monitor.

9. Apparatus as claimed in claim 7, wherein the memory comprises a single line memory receiving data to be stored sequentially.

10. Apparatus as claimed in claim 1, further comprising analogue-to-digital conversion means for supplying digital data to receiving means for receiving the pixel data.

11. Apparatus as claimed in claim 1, wherein said second unique configuration is substantially a mirror image of said first unique configuration.

12. The apparatus of claim 1, wherein said three coordinates and said fourth coordinate define corners of said window.

13. The apparatus of claim 1, wherein said gradient values include:
   first values of gradients between horizontally adjacent pixels of a first horizontal line of pixels;
   second values of gradients between horizontally adjacent pixels of a second horizontal line of pixels, said first horizontal line of pixels being adjacent to said second horizontal line of pixels; and
   third values of gradients between vertically adjacent pixels of said first horizontal line of pixels and said second horizontal line of pixels.

14. The apparatus of claim 1, wherein said gradient values include:
   first values of gradients between vertically adjacent pixels of a first vertically line of pixels;
   second values of gradients between vertically adjacent pixels of a second vertically line of pixels, said first vertically line of pixels being adjacent to said second vertically line of pixels; and
   third values of gradients between horizontal adjacent pixels of said first vertically line of pixels and said second vertically line of pixels.

15. The apparatus of claim 1, wherein said gradient values include a first value indicative that said adjacent pixels have similar color and/or luminescence, and/or do not include sudden changes.

16. An apparatus for identifying four coordinates of a window displayed on a monitor, said apparatus comprising:
   a generator configured to generate gradient values indicative of changes in pixel data of at least one image displayed on said monitor for adjacent pixels;
   a memory being configured to store said gradient values; and
   a detector configured to detect a first unique configuration in said gradient values to identify three coordinates of one edge of said window; said detector being configured to check in a direction perpendicular to said one edge to detect a second unique configuration in said gradient values to determine a fourth coordinate of said window, wherein said first unique configuration includes a first line of consecutive first level of gradients, and a second line gradients including at least one first gradient having said first level at a perpendicular location from a first end of said consecutive gradients and at least one second gradient having said one level at a diagonal location from a second end of said consecutive gradients.

17. The apparatus of claim 16, wherein said pixel data is obtained from RGB value.

18. The apparatus of claim 17, wherein the R, G and B values are summed with weighing factors in order to generate a representative luminance signal before being converted to said pixel data.

19. The apparatus of claim 16, wherein only green channel values are used.

20. The apparatus of claim 16, wherein the gradient values are determined by comparison with a predetermined threshold value.

21. The apparatus of claim 16, wherein the memory comprises at least one line memory.

22. The apparatus of claim 21, wherein the line memory has a length corresponding to the numbers of pixels in a row of the monitor.

23. The apparatus of claim 16, wherein the memory comprises a single line memory receiving data to be stored sequentially.

24. The apparatus of claim 16, wherein at least one of the first and second unique configurations the gradient values comprises a line of high gradient values in one of either the horizontal or the vertical direction, with high gradient value in the direction perpendicular to the line at one end of the line and a high gradient value diagonally adjacent the other end of the line.

25. The apparatus of claim 16, further comprising an analogue-to-digital converter configured to convert the pixel data to digital data.

26. The apparatus of claim 16, wherein said second unique configuration is substantially a mirror image of said first unique configuration.

27. The apparatus of claim 16, wherein said three coordinates and said fourth coordinate define corners of said window.

28. The apparatus of claim 16, wherein said gradient values include:
   first values of gradients between horizontally adjacent pixels of a first horizontal line of pixels;
   second values of gradients between horizontally adjacent pixels of a second horizontal line of pixels, said first horizontal line of pixels being adjacent to said second horizontal line of pixels; and
   third values of gradients between vertically adjacent pixels of said first horizontal line of pixels and said second horizontal line of pixels.

29. The apparatus of claim 16, wherein said gradient values include:
   first values of gradients between vertically adjacent pixels of a first vertically line of pixels;
   second values of gradients between vertically adjacent pixels of a second vertically line of pixels, said first vertically line of pixels being adjacent to said second vertically line of pixels; and
   third values of gradients between horizontal adjacent pixels of said first vertically line of pixels and said second vertically line of pixels.

30. The apparatus of claim 16, wherein said gradient values include a first value indicative that said adjacent pixels have similar color and/or luminescence, and or do not include sudden changes.

31. A monitor comprising an apparatus for identifying four coordinates of a window displayed on a monitor, said apparatus comprising:
   a generator configured to generate gradient values indicative of changes in pixel data of at least one image displayed on said monitor for adjacent pixels;
   a memory being configured to store said gradient values; and
   a detector configured to detect a first unique configuration in said gradient values to identify three coordinates of one edge of said window; said detector being configured to check in a direction perpendicular to said one edge to detect a second unique configuration in said gradient values to determine a fourth coordinate of said window,
   wherein said first unique configuration includes a first line of consecutive first level of gradients, and a second line gradients including at least one first gradient having said first level at a perpendicular location from a first end of said consecutive gradients and at least one second gradient having said one level at a diagonal location from a second end of said consecutive gradients.

32. The monitor of claim 31, wherein at least one of the first and second unique configurations in the gradient values comprises a line of high gradient values in one of either the horizontal or the vertical direction, with high gradient value in the direction perpendicular to the line at one end of the line and a high gradient value diagonally adjacent the other end of the line.

33. The monitor of claim 31, wherein the pixel data is obtained from RGB values.

34. The monitor of claim 33, wherein the R, G, and B values are summed with weighing factors in order to generate a representative luminance signal before being converted to digital data.

35. The monitor of claim 31, wherein only green channel values are used.

36. The monitor of claim 31, wherein the gradient values are determined by comparison with a predetermined threshold value.

37. The monitor of claim 31, wherein the memory comprises at least one line memory.

38. The monitor of claim 37, wherein the line memory has a length corresponding to the numbers of pixels in a row of the monitor.

39. The monitor of claim 37, wherein the memory comprises a single line memory receiving data to be stored sequentially.

40. The monitor of claim 31, further comprising an analogue-to-digital converter configured to convert the pixel data to digital data.

41. The monitor of claim 31, wherein said second unique configuration is substantially a mirror image of said first unique configuration.

42. The monitor of claim 31, wherein said three coordinates and said fourth coordinate define corners of said window.

43. The monitor of claim 31, wherein said gradient values include:
   first values of gradients between horizontally adjacent pixels of a first horizontal line of pixels;
   second values of gradients between horizontally adjacent pixels of a second horizontal line of pixels, said first horizontal line of pixels being adjacent to said second horizontal line of pixels; and
   third values of gradients between vertically adjacent pixels of said first horizontal line of pixels and said second horizontal line of pixels.

44. The monitor of claim 31, wherein said gradient values include:
   first values of gradients between vertically adjacent pixels of a first vertically line of pixels;
   second values of gradients between vertically adjacent pixels of a second vertically line of pixels, said first vertically line of pixels being adjacent to said second vertically line of pixels; and
   third values of gradients between horizontal adjacent pixels of said first vertically line of pixels and said second vertically line of pixels.

45. The monitor of claim 31, wherein said gradient values include a first value indicative that said adjacent pixels have similar color and/or luminescence, and/or do not include sudden changes.

46. A method for identifying four coordinates of a window displayed on a monitor comprising:
   generating gradient values indicative of changes in pixel data of at least one image displayed on said monitor for adjacent pixels;
   storing said gradient values; and
   detecting a first unique configuration in said gradient values to identify three coordinates of one edge of said window;
   checking in a direction perpendicular of said one edge to detect a second unique configuration in said gradient values to determine a fourth coordinate of said window,
   wherein said first unique configuration includes a first line of consecutive first level of gradients, and a second line gradients including at least one first gradient having said first level at a perpendicular location from a first end of said consecutive gradients and at least one second gradient having said one level at a diagonal location from a second end of said consecutive gradients.

47. The method of claim 46, wherein at least one of the first and second unique configurations in the gradient values comprises a line of high gradient values in one of either the horizontal or the vertical direction, with high gradient value in the direction perpendicular to the line at one end of the line and a high gradient value diagonally adjacent the other end of the line.

48. The method of claim 46, wherein the pixel data is obtained from RGB values.

49. The method of claim 48, wherein the R, G and B values are summed with weighing factors to generate a representative luminance signal before being converted to digital data.

50. The method of claim 46, wherein only green channel values are used.

51. The method of claim 46, wherein the gradient values are determined by comparison with a predetermined threshold value.

52. The method of claim 46, wherein said gradient values are stored in a memory, said memory comprising at least one line memory.

53. The method of claim 52, wherein the line memory has a length corresponding to the numbers of pixels in a row of the monitor.

54. The method of claim 52, wherein the memory comprises a single line memory receiving data to be stored sequentially.

55. The method of claim 46, further comprising converting the pixel data to digital data.

56. The method of claim 46, wherein said second unique configuration is substantially a mirror image of said first unique configuration.

57. The method of claim 46, wherein said three coordinates and said fourth coordinate define corners of said window.

58. The method of claim 46, wherein said gradient values include:

first values of gradients between horizontally adjacent pixels of a first horizontal line of pixels;

second values of gradients between horizontally adjacent pixels of a second horizontal line of pixels, said first horizontal line of pixels being adjacent to said second horizontal line of pixels; and third values of gradients between vertically adjacent pixels of said first horizontal line of pixels and said second horizontal line of pixels.

59. The method of claim 46, wherein said gradient values include:

first values of gradients between vertically adjacent pixels of a first vertically line of pixels;

second values of gradients between vertically adjacent pixels of a second vertically line of pixels, said first vertically line of pixels being adjacent to said second vertically line of pixels; and third values of gradients between horizontal adjacent pixels of said first vertically line of pixels and said second vertically line of pixels.

60. The method of claim 46, wherein said gradient values include a first value indicative that said adjacent pixels have similar color and/or luminescence, and/or do not include sudden changes.

* * * * *